Patented Jan. 9, 1945

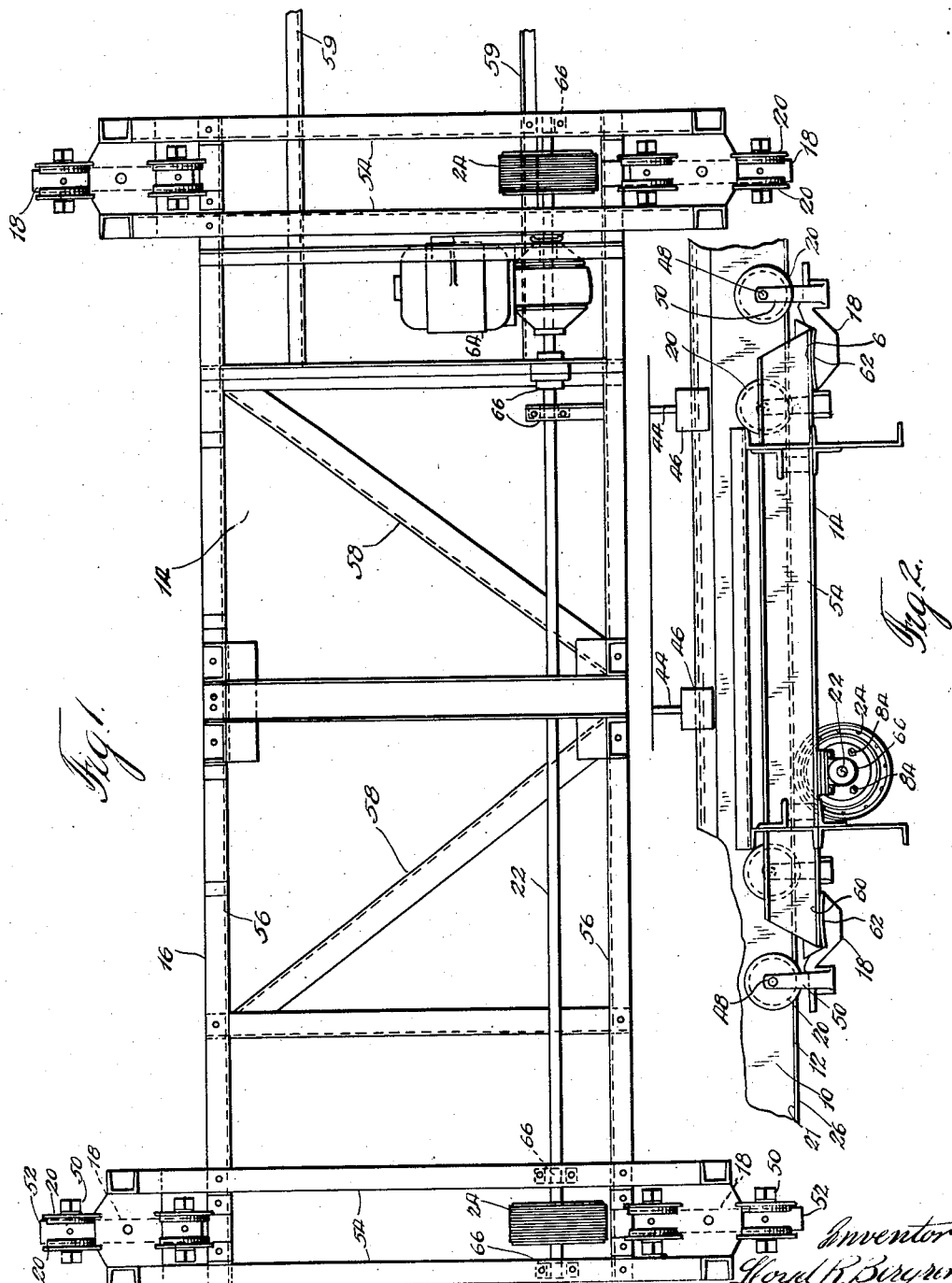

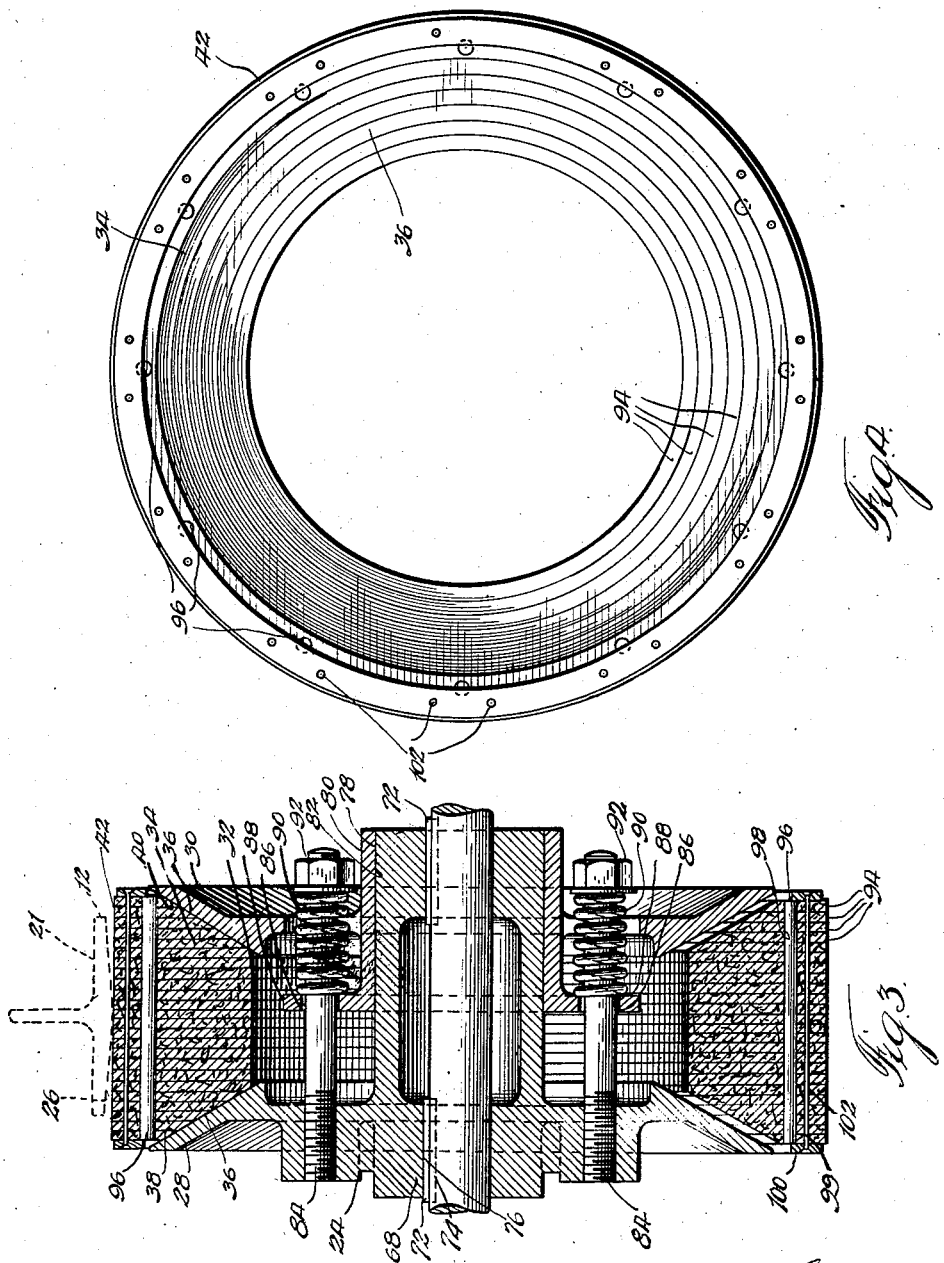

2,367,089

UNITED STATES PATENT OFFICE 2,367,089

TRACTION DEVICE

Lloyd R. Bergren, Fairfield, Iowa, assignor to The Louden Machinery Company, Fairfield, Iowa, a corporation of Iowa Application July 21, 1943, Serial No. 495,645

12 Claims. (Cl. 105—153)

This invention relates to overhead carriers, and particularly to a new drive for such carriers.

Overhead carrier devices ordinarily involve a carrier frame with supporting wheels movable on the upper surface of the flanges of spaced overhead rails. To propel such carriers, drive wheels are fixed on a drive shaft mounted on the carrier frame in fixed relation below the supporting wheels. Heretofore these drive wheels have been equipped with pneumatic rubber tires or so-called "airless" rubber tires for engagement with the lower surface of the carrier rail to drive the carrier when the drive shaft is rotated. Such driving devices have given satisfactory service over a long period of time. However, they have been subject to certain disadvantages. The problem of maintaining pressure within pneumatic tires has been somewhat difficult, due to the high position of the wheels; and the internal friction of the rubber tires, particularly the "airless" tires has been appreciable, due to the compression necessary to obtain the desired traction. Also, when power was applied to the drive shaft the rubber wheels were considerably distorted before the carrier was put in motion, and it has been found that sometimes, due to differences in the pressure of pneumatic wheels or difference in strength of other rubber wheels, one side of the carrier would start before the other and there would result a skewing action which tended to strain the carrier frame and to create excessive loads on the carrier rails. However, because of the simplicity and the general highly satisfactory performance of rubber wheel drive overhead conveyors, they have gone into very extensive use.

It is an object of the present invention to provide an improved drive for overhead conveyors.

It is another object to provide a traction wheel which may be used to replace rubber tired wheels in existing overhead conveyor drives.

It is a further object of the invention to provide a new overhead conveyor driving device which does not require a resilient rubber wheel and in which there is attained decreased friction losses and a more positive driving action than in hitherto known driving devices.

It is an additional object to provide an improved overhead carrier capable of smoother, more satisfactory operation.

Other objects and advantages will be in part explained hereinafter and in part illustrated in the accompanying drawings, in which—

Figure 1 is a plan view of a carrier of an overhead conveyor involving the present invention.

Fig. 2 is an end elevation of an overhead carrier showing a carrier rail with the supporting wheels and driving wheels of the carrier in operative relationship on said carrier rail.

Fig. 3 is a sectional elevation of a driving wheel according to the present invention.

Fig. 4 is a side elevation of a driving ring which may be employed in the driving wheel of the present invention.

The carrier shown in Figs. 1 and 2 is constructed for operation in an overhead conveyor system having spaced parallel carrier rail members 10 suspended from a ceiling or other support (not shown) and provided at their lower edges with substantially horizontal flanges 12. The carrier 14 comprises a rigidly braced frame 16 extending between spaced carrier rails 10, and supporting trucks 18 in which are mounted pairs of opposed flanged supporting wheels 20 resting on the upper surfaces 21 of the flanges 12 of the carrier rails. A power operated drive shaft 22 supported by the carrier frame 16 extends between carrier rails 10 in substantially fixed relationship below the supporting wheels 20.

The new drive wheels 24 of the present invention are mounted on the drive shaft 22 and engage the lower surfaces 26 of the carrier rails 10 and operate to drive the carrier 14 when the drive shaft 22 is rotated. As shown particularly in Fig. 3, these new driving wheels 24 involve resiliently pressed-together disk-like drive members 28 and 30 cooperating to form outwardly diverging circular grooves 32, and ring members 34 with portions of their edge surfaces 36 in engagement with the diverging drive surfaces 38 and 40 of the drive members 28 and 30, and with their peripheries 42 pressed into frictional engagement with the lower surfaces 26 of the carrier rails 10 by the pressure of the drive surfaces.

As shown more clearly in Fig. 2, the carrier rails 10 are suspended from a ceiling or other surface by means of adjustable stringer bolts 44 secured to brackets 46 on the upper portions of the I-beams. Pairs of opposed flanged wheels 20 resting on the upper surfaces 21 of the lower flanges of the I-beams are rotatably mounted on stub shafts 48 fixed at the ends of the arms of yokes 50 which are mounted at the opposite ends 52 of each carriage-supporting truck 18.

As shown in Figs. 1 and 2 the carrier frame 16 comprises a pair of spaced parallel end members 54 parallel to each carrier rail 10, transverse members 56 extending between the end members 54, and diagonal bracing members 58 to hold the carrier frame rigid. Angle bars 59 at one end of the carrier are provided to support a control cab (not shown) for movement with the carrier. Rocker portions 60 extending between the spaced parallel end members 54 adjacent the ends of those members engage rocker portions 62 at the centers of the trucks 18, so that the truck members 18 with their yokes 50 and pairs of opposed wheels 20 are rockably connected to the carrier frame 16 and equalize the load on the wheels 20, notwithstanding irregularities or unevenness of the carrier rails 10.

A gear reduction motor unit 64 mounted on the carrier frame 16 is connected to rotate the drive shaft 22 which extends parallel to the transverse members 56 between the carrier rails 10. Power may be supplied to the motor unit 64 by any suitable means such as power wires or bars (not shown) parallel to the supporting rails 10 and the motor may be controlled by any suitable controller. The drive shaft 22 is mounted in bearings 66 in fixed relation to the carrier frame 16 a determined distance beneath the flanged supporting wheels 20. Driving wheels 24 are mounted on the drive shaft 22 in position for engagement with the lower surfaces 26 of the carrier rails 10 for frictional engagement therewith to drive the carrier 14 when the drive shaft 22 is rotated by operation of the motor.

As shown particularly in Figs. 3 and 4, each drive wheel 24 comprises a first disk-like driving member 28 integral with a sleeve portion 68 having a bore 70 for snug engagement with the drive shaft 22. This driving member 28 is keyed to the shaft 22 for rotation therewith by a key 72 cooperating with a slot 74 on the shaft 22 and a slot 76 on the interior of the sleeve 68. The exterior of the sleeve portion 68 is a smooth cylindrical surface 78. A second disk-like driving member 30 having a sleeve portion 80 with a bore 82 of suitable dimensions is slidably mounted on the outer surface 78 of the sleeve portion 68 of the first disk-like member 28. Stud bolts 84 in threaded engagement with the first disk-like member 28 extend parallel to the drive shaft 22 through openings 86 in a flange 88 at the inner end of the sleeve 80 of the second disk-like member 30. Compression springs 90 are disposed on the portions of the bolts 84 extending through the openings 86 and are held in compressed position between the flange 88 and nuts 92 secured to the ends of the stud bolts 84, so that the disk-like members 28 and 30 are resiliently urged together. Also, the stud bolts 84 engage the flange 88 of the second driving member 30 to supply power thereto and cause it to rotate with the first driving member 28.

The surface portions 38 and 40 of the disk-like members 28 and 30, respectively, extend outwardly away from each other, forming a diverging circular groove 32. In the construction shown in Figs. 3 and 4 the outwardly extending surfaces 38 and 40 are frusto-conical, the conical surfaces being at an angle of approximately 60° to each other. The angle of 60° has been found highly practical but is not critical, since the angle may be appreciably greater or appreciably less, depending on the results desired. For example, if it is desired to increase the pressure of the ring 34 on the lower surface 26 of the rail 10 relative to the pressure of the ring on the drive surfaces 38 and 40, the angle could be increased and vice versa.

The driving ring member 34 is disposed between the opposed frusto-conical surfaces 38 and 40 of the disk-like driving members 28 and 30. As shown in the drawing, the ring 34 involves two surfaces 36 for driven engagement with the frusto-conical surfaces 38 and 40 of the disk-like members 28 and 30 disposed at an angle equal to the angle between the frusto-conical surfaces of the disk-like driving members, i. e., at an angle of 60° to each other, and a peripheral surface 42 for driving engagement with the lower surface 26 of the carrier rail at an angle of 60° to each of the other surfaces.

The pressure of the springs 90 resiliently urging the disk-like members 28 and 30 together, creates a component of force on the ring 34 strongly pressing it into firm frictional engagement with the carrier rail 10. The lower portion of the ring 34 is out of contact with the frusto-conical surfaces 38 and 40 of the disk-like members 28 and 30, so that the ring 34 can be forced up or down by the action of the frusto-conical members 28 and 30 or of the carrier rail 10, respectively, to accommodate differences or irregularities in the carrier rail.

As shown particularly in Figs. 3 and 4, a preferred form of the ring member 34 comprises a plurality of laminae 94 of fibrous material such as paper fiber disposed at right angles to the axis of the ring 34. The laminae 94 of fibrous material are impregnated with a resinous material such as tar, which strengthens the fibrous material and binds it together into an integral mass. In the construction of this ring 34, dowel pins 96, preferably of wood, are inserted in holes 98 drilled in the laminae 94 parallel to the axis of the ring member 34 at equally spaced points around the periphery of the ring. When the ring member 34 has been formed and impregnated, a series of additional holes 99 are formed around the periphery of the ring, metal rings 100 are placed on the face of the ring coaxial with the ring in a position to cover the holes 98, and a series of rivet members 102 are inserted through the metal rings 100 and holes 98 in the ring member 34 and riveted in place.

In the operation of the carrier 14 the rings 34 are strongly pressed into firm frictional engagement with the carrier rail 10 by the springs 90 acting through the disk-like driving members 28 and 30 and the conical surfaces 38 and 40. Also, the spring pressure effects a firm frictional engagement between the conical surfaces 38 and 40 of the members 28 and 30 and the edge surfaces 36 of the ring member. When the drive shaft 22 is rotated by operation of the gear reduction motor unit 64 the driving members 28 and 30 act on the rings 34 which in turn act on the carrier rails 10 to drive the carrier. The rings 34 are not appreciably distortable under the action of the driving members so that a firm uniform positive driving relation is secured between the motor unit 64 and the rails 10, and the carrier will be started smoothly without skewing action. Also, since the ring is substantially undistorted, there will be substantially no internal friction to overcome, and consequently there will be less power loss.

It will be seen that I have invented a driving mechanism made of non-critical material which is not only less expensive to manufacture than previous rubber tired drive mechanisms but can be used in places where, because of excessive heat, rubber cannot be used. Also, the driving mechanism operates with a drive shaft in fixed relation to the carrier rail so that it may be used to replace rubber drive wheels now in use. The driving ring may be easily removed without the use of special tools when it needs to be replaced, and the driving pressure against the under side of the carrier rail can be controlled by adjustment of the nuts retaining the springs, or by the substitution of different sized springs.

While the construction hereinabove described has been found highly satisfactory in use, it will be appreciated that modifications or variations may be made in the structure specifically shown without departing from the spirit of the invention. Thus, it is not necessary that the ring be formed of laminated fibrous material, since other material such as leather-surfaced wood might be used; or an endless friction member or band might be substituted for a stiff ring in smaller installations. Other structure might be employed for resiliently pressing together the outwardly diverging surfaces of the driving disc. Also the driving mechanism can be employed where only a single carrier rail and/or single driving wheel is provided. Accordingly, it will be apparent that the invention is not restricted to the specific details shown and described, and it is to be understood that the claims are to be construed as covering all structures which as a matter of language may be held to fall within the accompanying claims.

I claim:

1. A traction device comprising coaxial, outwardly diverging drive surfaces cooperating to form a circular groove, an endless friction member disposed with portions of its inner surface in engagement with said diverging drive surfaces, and means acting through said drive surfaces urging said endless member portions away from the axis of said drive surfaces, for traction engagement with another surface, said endless member being of such length that when exerting tangential force it will be in tangentially driven frictional rolling engagement with said drive surfaces.

2. A traction device comprising coaxial, outwardly diverging drive surfaces cooperating to form a circular groove, a ring member with portions of its inner surface in engagement with said diverging drive surfaces, and resilient means acting through said drive surfaces urging said ring member portions away from the axis of said drive surfaces for engagement with a surface, said ring member being of such length that when exerting tangential force it will be in tangentially driven frictional rolling engagement with said drive surfaces.

3. A traction device comprising coaxial opposed conical members forming a circular, substantially V-shaped groove between them, a ring member with portions of its inner surface in engagement with said conical members, and resilient means acting through said conical members urging said ring member portions away from the axis of said conical members for engagement with a fixed surface, said ring member being of such length that when exerting tangential force it will be in tangentially driven frictional rolling engagement with said conical members.

4. A traction device for use in driving an overhead conveyor comprising a supporting wheel for engagement with an overhead rail, and a traction device comprising coaxial driving wheels with their axis at a substantially fixed distance below the supporting wheel, outwardly diverging drive surfaces on said driving wheels cooperating to form a circular groove between them, an endless friction member with portions of its inner surface in engagement with said diverging drive surfaces, and resilient means acting through the driving wheels and said diverging drive surfaces to force said endless member portions away from the axis of said driving wheels and force said endless member resiliently against the lower surface of said rail, said endless member being of such length that when exerting tangential force it will be in tangentially driven frictional rolling engagement with said drive surfaces.

5. In an overhead conveyor system, a rail, a supporting wheel adapted for travel on said rail, a carrier supported by said supporting wheel, a drive shaft movable with said carrier and supported a substantially constant distance below said rail, means to rotate said shaft, a drive wheel mounted on said shaft for rotation therewith, and an endless friction member resiliently pressed between said wheel and said rail, said friction member being formed of relatively stiff material which is not substantially distorted under load, succeeding portions of said friction member being forced toward the axis of said drive wheel by said rail as they approach the place of maximum pressure.

6. In an overhead conveyor system, a rail, a supporting wheel adapted for travel on said rail, a carrier supported by said supporting wheel, a drive shaft movable with said carrier and supported a substantially constant distance below said rail, means to rotate said shaft, a V-grooved wheel mounted on said shaft for rotation therewith and having two coned sides movable relative to each other axially of the shaft, means resiliently urging said sides towards each other to increase the effective diameter of said wheel, and an endless friction member pressed between said sides and said rail, succeeding portions of said friction member being forced toward the axis of said wheel by said rail as they approach the place of maximum pressure.

7. An overhead conveyor comprising spaced carrying rails, supporting wheels mounted for movement on each of said carrier rails, a carrier supported by said supporting wheels on said spaced carrier rails, and driving means comprising a drive shaft movable with said carrier and supported a substantially constant distance below said carrier rails, means to rotate said shaft, drive wheels mounted on said shaft for rotation therewith and positioned substantially below each of said spaced carrier rails, and endless friction members for each of said wheels, said friction members being resiliently pressed between said wheels and said rails, and being formed of stiff material which is not substantially distorted under load, succeeding portions of said friction members being forced toward the axis of said drive wheels by said rail as they approach the place of maximum pressure.

8. An overhead carrier comprising spaced overhead carrying rails, supporting wheels mounted for movement on each of said overhead carrier rails, a carrier supported by said supporting wheels on said spaced carrier rails, and driving means comprising a drive shaft in fixed spaced relation below said supporting wheels, extending between said spaced carrier rails, means to rotate said shaft, V-grooved wheels mounted on said shaft for rotation therewith in positions below each of said carrier rails, each of said wheels having two coned sides movable relative to each other axially of the shaft, means resiliently urging said sides towards each other to increase the effective diameter of said wheel, and an endless friction member resiliently urged outward by the pressure of said sides into frictional engagement with said rail, succeeding portions of said friction member being forced toward the axis of said drive wheel by said rail as they approach the place of maximum pressure.

9. An overhead conveyor comprising spaced overhead carrier rails, supporting wheels mounted for movement on each of said overhead carrier rails, a carrier supported by said supporting wheels on said spaced carrier rails, and driving means comprising a drive shaft in fixed spaced relation below said supporting wheels, extending between said spaced carrier rails, and having a traction device mounted at each end of the shaft for driving engagement with the lower surfaces of said spaced carrier rails, each of said traction devices comprising coaxial driving wheels mounted on said drive shaft, outwardly diverging drive surfaces on said wheels cooperating to form a circular groove between them, means resiliently urging said driving wheels together, and a ring member with a portion of its inner surface in engagement with said diverging drive surfaces, the cross section of said ring member being such that the outer periphery of the ring member is adapted to be forced into frictional engagement with the lower surface of an overhead carrier rail by the resilient means acting through the driving wheels and the diverging drive surfaces on the inner surface of the ring member, succeeding portions of said ring member being forced toward the axis of said wheels by said rail as they approach the place of maximum pressure.

10. In a traction device comprising a drive shaft, and a drive ring for driving engagement with a surface, a drive surface fixed to a sleeve mounted on said shaft for rotation therewith, a second drive surface fixed to a sleeve coaxial with the first mentioned sleeve, said drive surfaces diverging outwardly away from each other to form a circular groove, and means resiliently urging said drive surfaces towards each other, to force said drive ring against said surface, succeeding portions of said ring being forced toward the axis of said drive surfaces by said rail as they approach the place of maximum pressure.

11. In a traction device comprising a drive shaft, a drive ring for driving engagement with a surface, a drive member comprising a drive surface fixed to a sleeve mounted on said shaft for rotation therewith, a second drive member comprising a drive surface fixed to a sleeve slidably mounted on the exterior of said first mentioned sleeve, said drive surfaces diverging outwardly away from each other to form a circular groove, and means acting through said drive members resiliently urging said drive surfaces towards each other, to force said drive ring against said surface, succeeding portions of said ring being forced toward the axis of said drive surfaces by said rail as they approach the place of maximum pressure.

12. A traction device comprising a drive shaft, a drive ring for driving engagement with a surface, a drive member comprising a drive surface fixed to a sleeve mounted on said shaft for rotation therewith, a second drive member comprising a drive surface fixed to a sleeve slidably mounted on the exterior of said first mentioned sleeve, said drive surfaces diverging outwardly away from each other to form a circular groove, a flange at the end of the second-mentioned of said sleeves nearest the first-mentioned of said drive surfaces, spaced holes in said flange, bolts with one end rigidly fixed in the first-mentioned of said drive members, extending through the holes in said flange, and resilient means acting between the flange and the portions of said bolts extending through said holes urging said drive surfaces together, to force said drive ring against said surface, succeeding portions of said ring being forced toward the axis of said drive surfaces by said rail as they approach the place of maximum pressure.

LLOYD R. BERGREN.